United States Patent
Nagato et al.

(10) Patent No.: US 7,388,832 B2
(45) Date of Patent: Jun. 17, 2008

(54) CALL-ADMISSION CONTROLLER AND METHOD OF CALL-ADMISSION CONTROL

(75) Inventors: Rie Nagato, Yokosuka (JP); Yoshihiro Ishikawa, Yokosuka (JP); Kazunori Obata, Yokosuka (JP); Seizo Onoe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 700 days.

(21) Appl. No.: 10/828,266

(22) Filed: Apr. 21, 2004

(65) Prior Publication Data
US 2004/0213153 A1    Oct. 28, 2004

(30) Foreign Application Priority Data
Apr. 22, 2003  (JP) .............................. 2003-117410

(51) Int. Cl.
  H04L 12/26  (2006.01)
  H04L 12/28  (2006.01)
  H04J 3/16   (2006.01)
(52) U.S. Cl. .................. 370/230; 370/395.2; 370/468
(58) Field of Classification Search ................ 370/230, 370/395.2, 468
See application file for complete search history.

(56) References Cited

U.S. PATENT DOCUMENTS 5,583,857 A * 12/1996 Soumiya et al. ............ 370/233
6,760,594 B1 *  7/2004 Murasawa et al. .......... 455/512

FOREIGN PATENT DOCUMENTS

| CN | 1361606 | 7/2002 |
|---|---|---|
| EP | 1 041 774 A2 | 10/2000 |
| JP | 3-289748 | 12/1991 |
| JP | 6-164621 | 6/1994 |
| JP | 2001-197208 | 7/2001 |
| JP | 2002-190830 | 7/2002 |
| JP | 2002-223239 | 8/2002 |
| WO | WO 02/32097 | 4/2002 |

* cited by examiner

Primary Examiner—Benny Q. Tieu
Assistant Examiner—Srinivasa R Reddivalam
(74) Attorney, Agent, or Firm—Oblon, Spivak, McClelland, Maier & Neustadt, P.C.

(57) ABSTRACT

A call-admission controller is disclosed that allocates, out of shared resources in a communications system, resources required for communication in multiple calls of different priorities. The controller includes an impact-judging unit configured to make a judgment of, when having detected a low-priority call, the impact of the low priority call on the communications system, and a low-priority call admission-determining unit configured to make, based on the impact of which the judgment is made, a determination of whether to admit the low-priority call.

5 Claims, 5 Drawing Sheets

CALL-ADMISSION CONTROLLER AND METHOD OF CALL-ADMISSION CONTROL

BACKGROUND OF THE INVENTION

1. Field of the Invention

The present invention generally relates to a call-admission controller and a method of call-admission control, and particularly relates to a call-admission controller and a method of call-admission control in a communications system wherein resources are shared by calls of multiple priority classes.

2. Description of the Related Art

In a public communications system in which a large number of subscribers use common equipment to communicate, when a user requests to start a communication, or requests to add a circuit in order to set up a higher-speed circuit, a circuit is allocated out of idle communication equipment resources, so that when the communication is completed, the allocated circuit is released so as to prepare for allocating the circuit for other communications.

Moreover, when allocating a circuit, whether there are idle (not in use) resources sufficient to fulfill a request for communication is determined so that, when there are sufficient resources, the call for communication is accepted, while otherwise the call requesting communication as described above is rejected, and a control method which maintains the quality of an already ongoing communication, or a call-admission control method, is performed.

In the meantime, services provided by such a communications system as described above include voice calls, video telephone, facsimile communication, file downloading, file transfer and the like, which are available to users of fixed telephones, portable telephones and the like. The users enter into correspondingly different contracts, such as fixed charging and variable charging, with operators who provide the services as described above.

Moreover, calls handled within a communications system include normal calls as well as emergency calls such as "110" (for the police), "119" (for the fire and ambulance) and the like. Within the communications system, these different kinds of calls exist simultaneously in large numbers so that shared resources are utilized. Since these shared resources are finite, in a case that the shared resources are allocated in the order of occurrence of the calls, when an emergency call such as "110" and the like occurs, the admission request of the emergency call ends up getting rejected in a case that no idle shared resources exist. In other words, in order to respond to various requests for communications from the users, it is necessary to efficiently allocate the resources to calls of different kinds.

Therefore, a method of call-admission control which, depending upon the importance or the priority of a call, differentiates the ease of allocation of the call is being proposed (for example, refer to Patent Document 1). According to this method of call-admission control, different threshold values are set for services of different priorities so that shared resources are allocated depending upon the priorities. A description is disclosed in which, thereby, call admission is controlled depending upon a service utilized by the user, avoiding degradation in communications quality.

Moreover, when many high-priority calls requesting a large amount of resources occur, even in a case where there are idle shared resources sufficient to be allocated to a low priority call requesting a small amount of resources, all of those call admission requests end up getting rejected until a release of a currently ongoing call occurs. Thus, in order to avoid this sort of problem, a method of call-admission control is considered such that, when there are not many idle shared resources, a call with a large amount of requested resources is rejected, while a call with a small amount of requested resources is admitted. A technology disclosed as described in Patent Document 2, the technology proposed from these viewpoints, by providing individual call-admission threshold values depending upon the required resource amount per type of call, even in a case that many communications requests requiring a large amount of resources exist, enables maintaining a high resource usage rate.

Patent Document 1

JP 2002-223239A

Patent Document 2

JP 2002-190830A

However, with the related-art method of call-admission control, there is a problem that, while the ease of allocation is differentiated depending upon the importance or the priority of a call, when there are no longer many idle shared resources, the resources cannot utilized efficiently.

Furthermore, when there are not many idle shared resources, a method of changing the ease of allocation of the shared resources depending on the required resource amount per type of call is adopted, whereas once there are no longer many idle shared resources, a call with a high resource requirement ends up getting rejected. Thus, there is a problem of not being able to differentiate the importance or the priority of calls.

SUMMARY OF THE INVENTION

It is a general object of the present invention to provide a call-admission controller and a method of call-admission control, that substantially obviate one or more problems caused by the limitations and disadvantages of the related art.

In light of the problems as described above, it is a more particular object of the present invention to provide a call-admission controller and a method of call-admission control that enable allocating calls depending upon the priorities and increasing the usage efficiency of shared resources.

According to the invention, a call-admission controller which allocates, out of idle shared resources in a communications system, resources required for communication in multiple calls of different priorities includes an impact-judging unit configured to make a judgment of, when having detected a low-priority call, the impact of the low priority call on the communications system, and a low-priority call admission-determining unit configured to make, based on the impact of which the judgment is made, a determination of, whether to admit the low-priority call.

The call-admission controller in an embodiment of the invention enables increasing the usage efficiency of the shared resources.

According to another aspect of the invention, a method of call-admission control which allocates, out of idle shared resources in a communications system, resources required for communication in multiple calls of different priorities includes the steps of judging, when having detected a low-priority call, the impact of the low-priority call on the communications system, determining, when judged that the impact is large, a low-priority call-admission threshold value so that the ease of allocation of the low-priority call is set to be lower than the ease of the allocation of a high-priority call, and determining, according to the determined call-admission threshold value, whether to admit the low-priority call.

The method of call-admission control in an embodiment of the invention enables increasing the usage efficiency of the shared resources.

Other objects and further features of the present invention will be apparent from the following detailed description when read in conjunction with the accompanying drawings.

DETAILED DESCRIPTION OF PREFERRED EMBODIMENTS

In the following, embodiments of the present invention are described with reference to the accompanying drawings.

Figure 1:
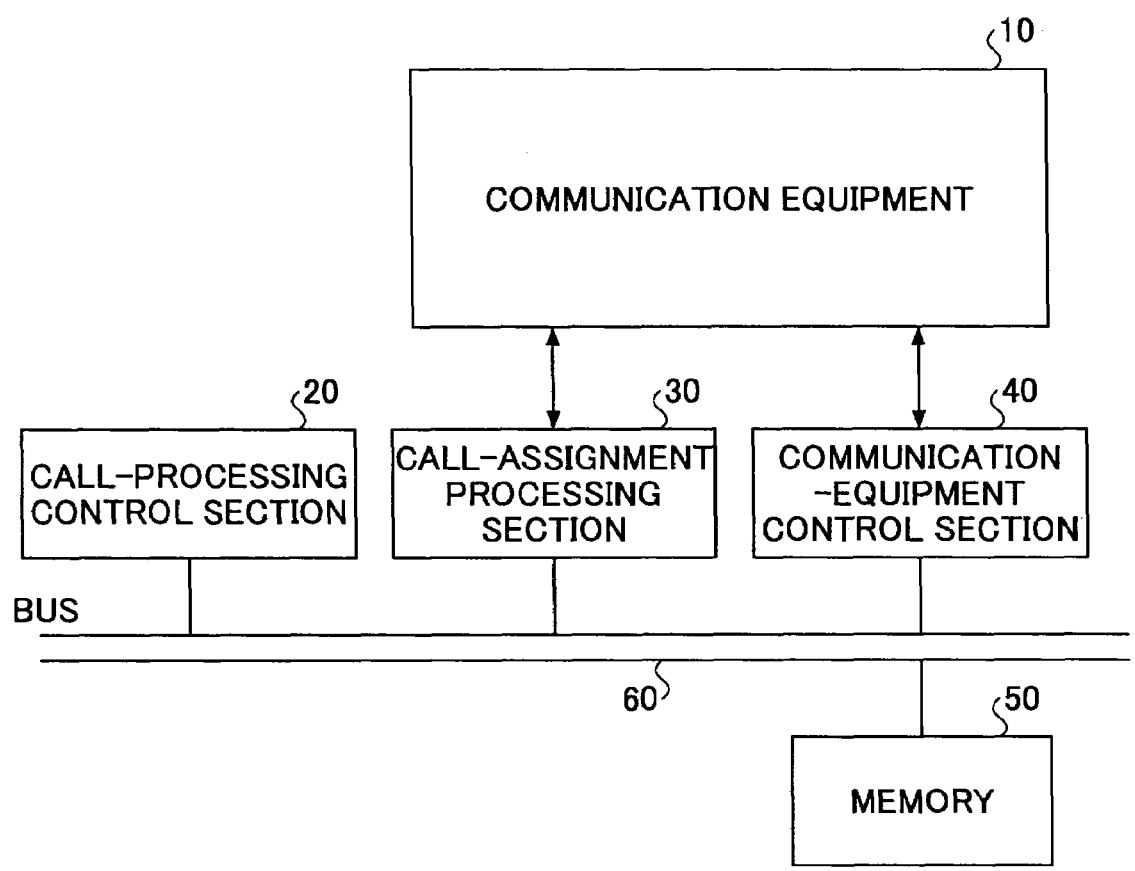
FIG. 1 is a functional block diagram of a configuration of a call-admission controller according to an embodiment of the present invention.

FIG. 1 is a functional block diagram illustrating a configuration of a call-admission controller according to an embodiment of the present invention.

In FIG. 1, this call-admission controller consists of communication equipment 10 which is shared for use by multiple communications users, a call-processing control section 20 which directs to a communication-equipment control section 40 an allocating, a releasing and the like of shared resources, a call-admission processing section 30 which reads out information from a memory 50 so as to determine whether to admit a call, a communication-equipment control section 40 which performs the allocating, the releasing and the like of the shared resources, manages the currently in-use shared resources amount and outputs the in-use resources amount and the usage rate to the memory 50 so as to be held, and the memory 50, these components of the call-admission controller being connected via a bus 60.

Figure 2:
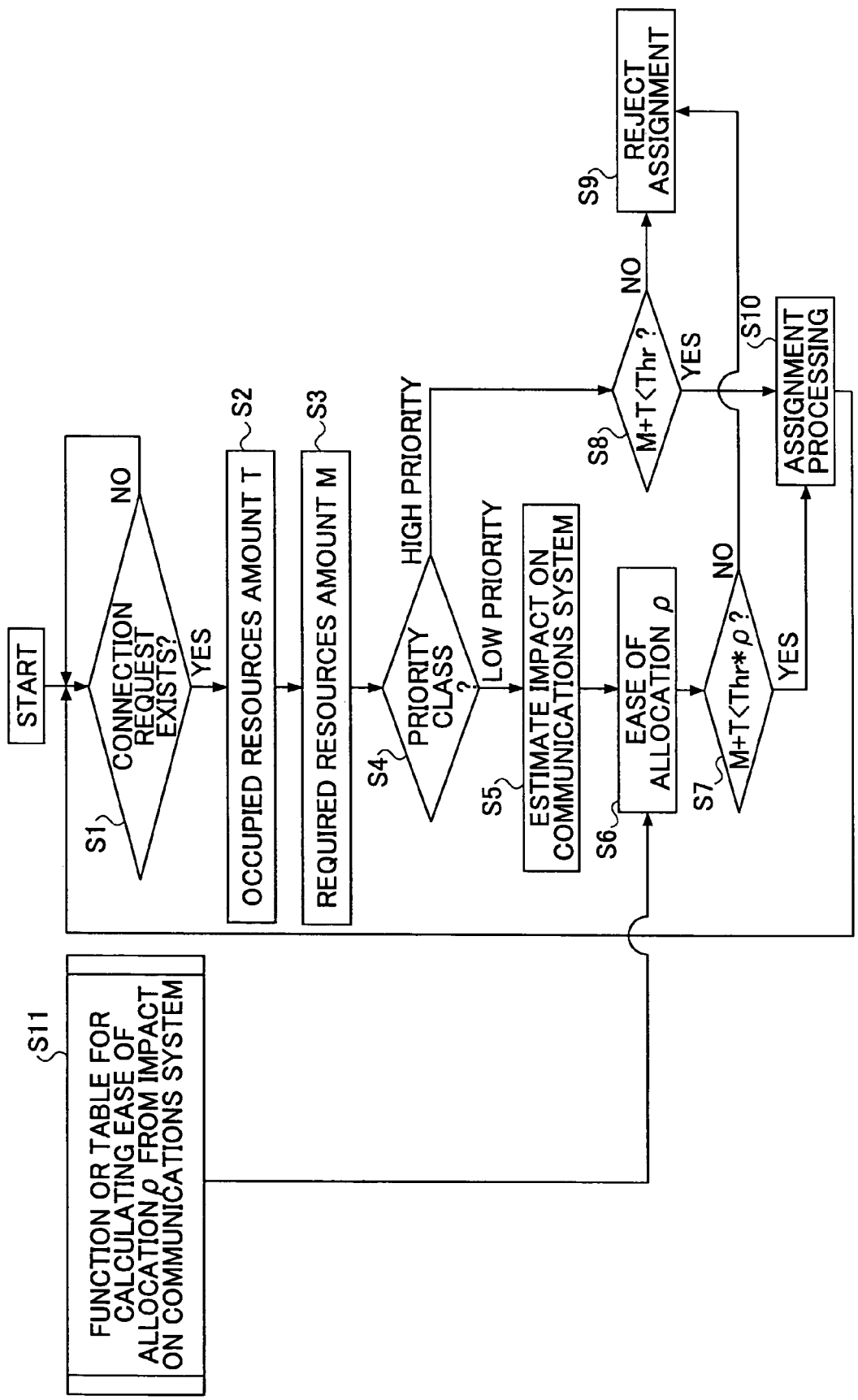
FIG. 2 is a flowchart for an operation according to a first embodiment of the present invention.

FIG. 2 is a flowchart for describing an operation according to a first embodiment of the present invention.

First, the call-admission processing section 30 checks for a connection request for a call, and, if there is a connection request for a call (Yes in Step S1), proceeds to Step S2, while, if there is no connection request for a call, waits for a connection request for a call. Once a connection request for a call is received in Step S1, the communication-equipment control section 40 obtains currently in-use shared resources amount T (Step S2) and furthermore obtains requested resources amount M of the connection-requested call (Step S3). The communication-equipment control section 40, upon thus obtaining the in-use shared resources amount T and the requested resources amount M, places these sets of information in the memory 50.

The call-admission processing section 30 in Step S4 determines the priority of a call requesting a connection so that, when the priority class is high-priority (high-priority in Step S4), the call-admission threshold value is set to a threshold value Thr, of the high-priority class, defined in advance. Subsequently, the shared resources amount T and the required resources amount M held in the memory 50 are read out so as to compute the total value such that, if the total value is less than Thr (Yes in Step S8), call-admission processing is performed (Step S10) while, if the total value as described above is not less than Thr (NO in Step S8), a process which rejects the call is performed (Step S9).

On the other hand, when a call requesting a connection is determined to be a low priority (low-priority in Step S4), in a case that this low-priority call is allocated, the impact on the communications system is estimated (judged) (Step S5). More specifically, by measuring one or multiple exemplary measurement items as described below, the impact on the communications system as described above is estimated:

1. The number of circuits requested for the call;
2. The transmission speed;
3. The estimated time up to which the call completes communicating;
4. The data amount which the call intends for the communication;
5. The transmission power of the communication equipment required for the call;
6. When starting the communication, the amount of interference caused on the communication equipment or other already ongoing calls;
7. The type of location of occurrence of the call (within a building, within a mobile unit, suburb, downtown, resort, residential district, business district, entertainment district and the like);
8. The distance between the user placing the call and the communication equipment;
9. The travelling speed of the user; and
10. The type of the user terminal used for the call (for example, telephone with only a call function, telephone with a facsimile function, portable telephone, personal data assistant (PDA), notebook-type computer, video telephone, an image terminal and the like).

For example, when measuring the number of circuits requested for the call as described above in 1. above so as to judge the impact on the communications system, the larger the measured number of the circuits requested, the larger impact on the communications system becomes. Moreover, the smaller the number of the circuits requested, the smaller the impact on the communications system becomes.

The call-admission processing section 30, upon completing the estimating of the impact on the communications system as described above, based on the estimated impact, calculates the indicator ρ indicating the ease of allocation of a low-priority call using a function defined in advance (Step S6). Herein, ρ assumes a value such that $0 \leq \rho \leq 1$. The call-admission processing section 30, after calculating ρ as described above, sets the call-admission threshold value for the low-priority class to Thr*ρ (Step S7), and, when the total value (M+T) of the shared resources amount T and the requested resources amount M is less than Thr*ρ (YES in Step S7), call-admission processing is performed (Step 10), while, when (M+T) as described above is not less than Thr*ρ (NO in Step S7), processing which rejects the call is performed (Step S9).

For either one of a low-priority call and a high-priority call, after undergoing admission processing in Step S10, the operation returns to the start (S1) of the loop process so that the same process as described above is repeated. Moreover, the performing of the call-admission processing in Step S10 causes the corresponding call to be set up at the call-processing control section 20 so that the communication may be started.

In the present embodiment, while a case of seeking the ease of allocation ρ from the impact on the communications system according to a predetermined functional expression is described, a table correlating the impact, as described above, with ρ (Step S11) may be prepared in advance so as to obtain the desired ρ by referring to this table.

Thus, in the present embodiment, the connection requests for low-priority calls undergo admission-processing not evenly but depending upon the judged degree of impact on the communications system. For example, when the impact of a low-priority call on the communications system is small the ease of allocation of the low-priority call is raised, whereas when the impact is large the ease of allocation of the low-priority call is lowered. In other words, changing the admission-threshold value of a low-priority call depending on the degree of impact on the communications system enables efficient allocating of a low-priority call under the present usage conditions of the shared resources, effectively causing an increase in the usage efficiency of the shared resources.

Figure 3:
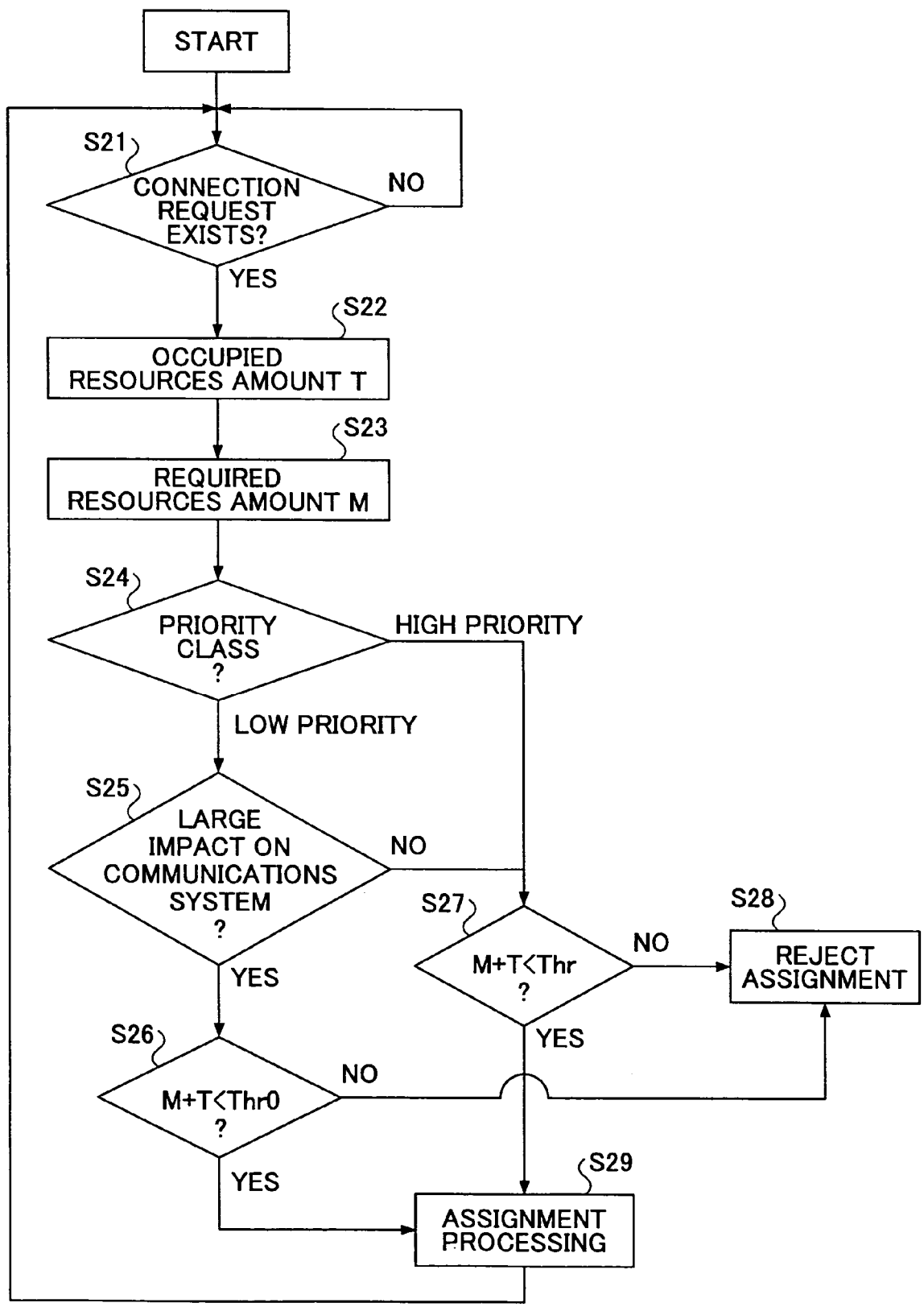
FIG. 3 is a flowchart for an operation according to a second embodiment of the present invention.

FIG. 3 is a flowchart for describing an operation according to a second embodiment of the present invention.

In this embodiment, the same operations for the first embodiment as described above are performed in Steps S21 through S24. Therefore, hereafter, operations from Step S25 onward are described.

For a call-admission processing section 30, in a case that the priority class of a call for which a connection is requested is a low-priority class, the impact on the communications system in a case that the call is allocated is measured (Step S25) so that, if the impact does not exceed a threshold value defined in advance (No in Step 25), the call-admission threshold value is set to Thr of the high-priority class. On the other hand, in a case that the impact as described above exceeds the threshold value defined in advance (Yes in Step S25), the call-admission threshold value is set to Thr0 of the low-priority class.

In the call-admission processing section 30, when in Step S25 the impact on the communications system of the low-priority call is determined to be small (No in Step S25), whether the total value (M+T) of the shared resources amount T and the requested resources amount M is less than Thr is determined (Step S27), whereas when the impact on the communications system of the low-priority call as described above is determined to be large (Yes in Step S25), whether the value of (M+T) as described above is less than Thr0 is determined (Step S26).

The call-admission processing section 30 when in Step S26 determines that (M+T)<Thr0 is fulfilled or in Step S27 determines that (M+T)<Thr is fulfilled (Yes in Step S26 or Yes in Step S27) performs admission processing of a low-priority call for which a connection request is made (Step S29), otherwise (No in Step S26 or No in Step S27) performs processing to reject the call as described above (Step S28). Hereby, a simpler implementation of admission control of a low-priority call is enabled.

Moreover, in the present embodiment, while a case of using one threshold value for determining the size of the impact of a low-priority call on the communications system is described, it is not limited to such a case so that multiple threshold values may be used. For example, when not exceeding the lowest threshold value, the admission-threshold value for a low-priority call may be set to be the same as that for a high-priority call, while when exceeding the lowest threshold value as described above, the admission-threshold value for the low-priority call that is calculated according to the arithmetic expression as previously described may be used.

Figure 4:
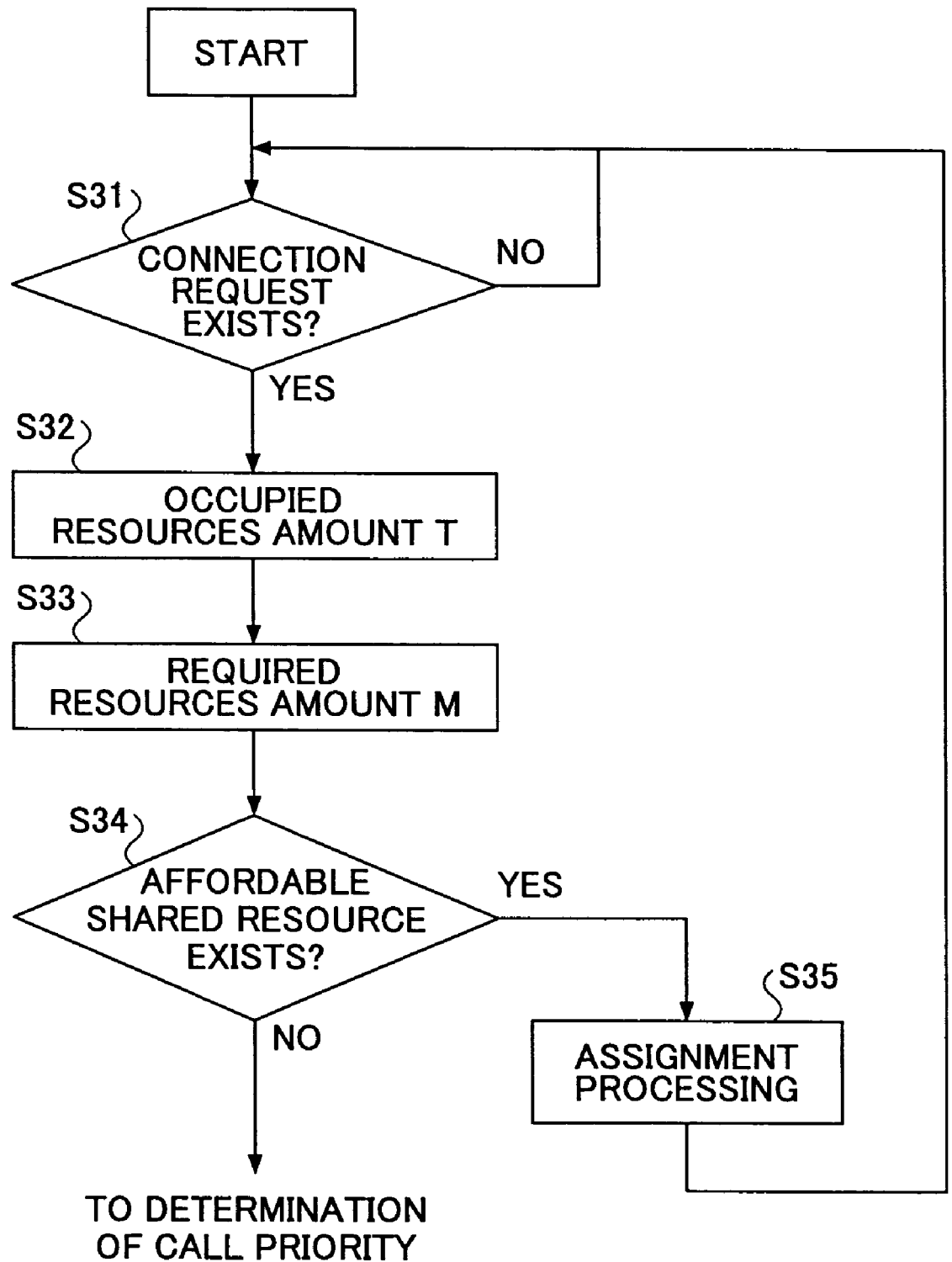
FIG. 4 is a flowchart for an operation according to a third embodiment of the present invention.

FIG. 4 is a flowchart for describing an operation according to a third embodiment of the present invention.

In a case of the present embodiment, the same operations as in the first or the second embodiment as described above are performed in Steps S31 through S33. Therefore, hereafter, operations from Step S34 onward are described.

The call-admission processing section 30, with a connection request for a call, first, estimates the remaining (idle) amount of shared resources, in a case of having admitted the call for which the connection request was made, from the in-use shared resources amount T and the requested resources amount M (Step S34), performs the above-described call-admission processing (Step S35) only when it is determined that there are affordable shared resources (Yes in Step S34), while when it is determined that there are no affordable shared resources (No in Step S34), proceeds to the process of determining the call priority as described above. This process of determining the priority as well as the subsequent processes are performed in the same manner as in the first or the second embodiments as described above.

Thus, according to the present embodiment, when there are affordable shared resources, the process of determining the call priority is abbreviated so as to enable a simplifying of the process when there are shared resources affordable.

Figure 5:
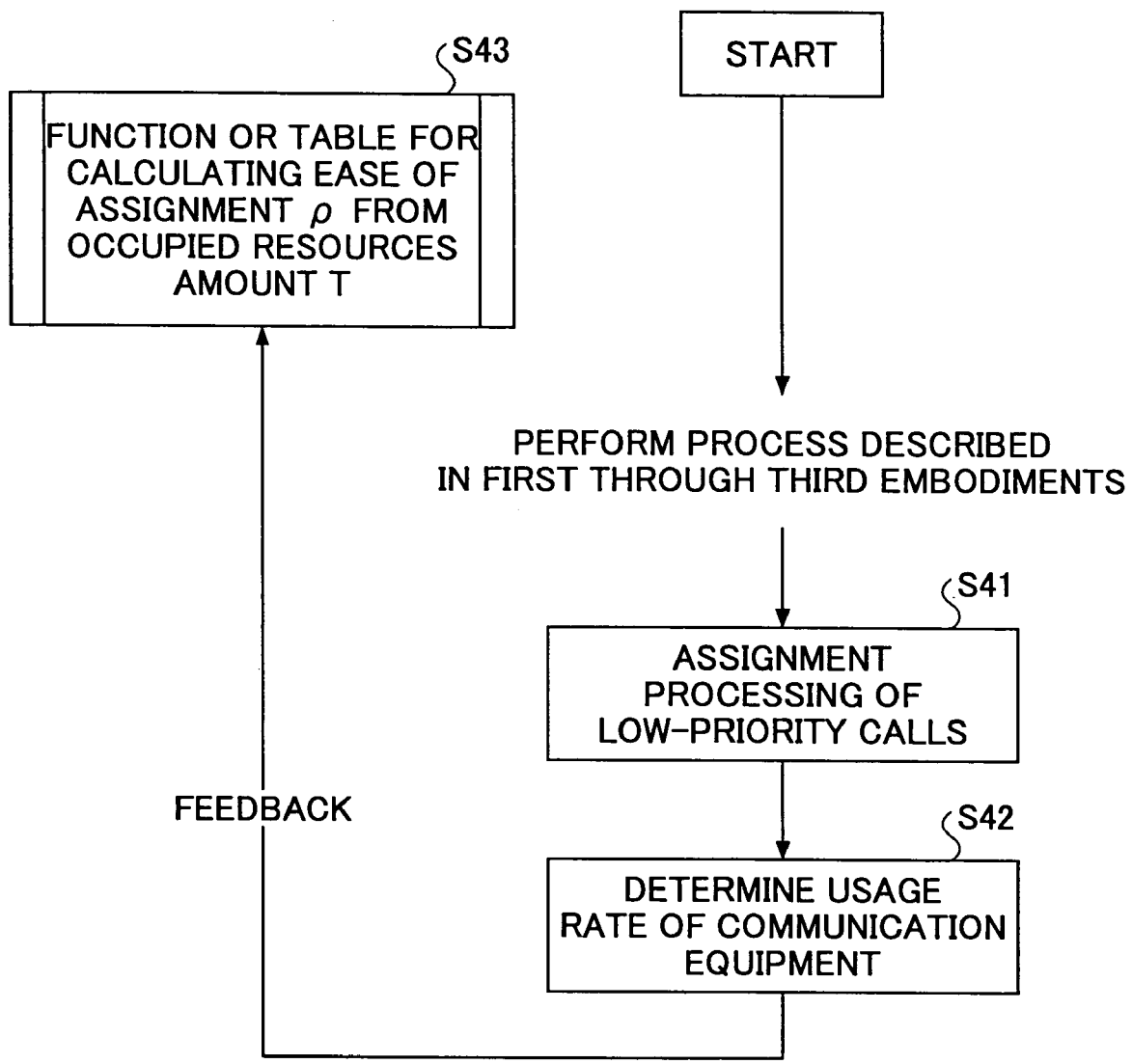
FIG. 5 is a flowchart for an operation according to a fourth embodiment of the present invention.

FIG. 5 is a flowchart for describing an operation according to a fourth embodiment of the present invention.

In the present embodiment, the same operations as in the first through the third embodiments as described above are processed. Therefore, hereafter, the admission processing of a low-priority call and onward is described.

A call-admission processing section 30, after performing admission processing of a low-priority call (Step S41), measures the usage rate of the communication equipment (Step S42) so as to provide feedback which causes a change in the function or the table which calculates ρ as described above from the amount of change in the usage rate.

The usage rate of the communication equipment is measurable by observing, for example, the number in use, or the usage rate, of circuits in the shared resources, the transmission power amount or the received interference amount of the communication equipment, the received interference amount in ongoing calls, the completion rate or the error rate of ongoing calls, the throughput, the delay time and the like.

In the feedback as described above, it is possible, for example, to determine the level of usage rate by substituting, into an arithmetic expression defined in advance, the usage rate of the communication equipment after the admission-processing, and to perform a control operation which changes the function or shifts the referring location in the table in such a manner that ρ is set to be smaller, the higher the usage rate; while ρ is set to be larger, the lower the usage rate.

Thus, according to the present embodiment, the indicator ρ which indicates the ease of allocation of a low-priority call is properly updated depending upon the current usage condition of the communication equipment, enabling more precise control of the admission processing of the low-priority call.

Furthermore, it is possible to perform a determination of the usage rate by comparing equipment usage with a value determined in advance rather than by using the arithmetic expression as described above. Furthermore, it is possible to use the size of the amount of change in the usage rate of the communication equipment before and after the call-admission processing for determining the relevant usage rate.

The present application is based on Japanese Priority Patent Application No. 2003-117410 filed Apr. 22, 2003, with the Japanese Patent Office, the entire contents of which are hereby incorporated by reference.

What is claimed is:

1. A call-admission controller which allocates, out of shared resources in a communications system, resources required for communication in a plurality of calls of different priorities, the controller comprising:

an impact-judging unit configured to estimate, upon detection of a low-priority call, an impact of said low priority call on the communications system;

a call-admission threshold-value varying unit configured to adjust a call-admission threshold-value for the low-priority call based on the estimate of said impact, and set, based on said impact, an indicator indicating an ease of allocation of the low-priority call, so as to cause, using the set indicator, a change in said call-admission threshold-value for the low-priority call;

a low-priority call admission-determining unit configured to make, based on said adjusted threshold value, a determination of whether to admit said low-priority call; and a defining unit configured to define said indicator as a function determining the ease of the allocation of the low-priority call, wherein said function sets the call-admission threshold-value for the low-priority call to be equivalent to the call-admission threshold-value for a high-priority call when said impact does not exceed a threshold value defined in advance, and sets the call-admission threshold-value for the low-priority call to be lower than the call-admission threshold-value for the high-priority call when said impact exceeds said threshold value defined in advance.

2. The call-admission controller as claimed in claim 1, wherein said impact-judging unit is further configured to estimate, from one or a plurality of the following factors, the number of circuits required for the low-priority call to perform the communication, the time up to completing the communication, the transmission data amount, the power required by communication equipment for performing the communication, the interference amount caused on other ongoing calls, the location of occurrence of said call, the travelling speed of a terminal causing said call, and the type of the terminal causing said call, said impact of said low-priority call on the communications system.

3. The call-admission controller as claimed in claim 1, wherein the judgment by the impact-judging unit of the impact of the low-priority call on the communications system, and the determination by the low-priority call admission-determining unit of whether to admit said low-priority call are performed when there are not many idle shared resources.

4. The call-admission controller as claimed in claim 1, further comprising:

a measuring unit configured to measure, when having detected a call requesting a connection, a change in the usage condition of a communication equipment; and a changing unit configured to change said function depending on the amount of said change in the usage condition.

5. A method of call-admission control which allocates out of shared resources in a communications system resources required for communication in a plurality of calls of different priorities, said method comprising:

estimating, upon detection of a low-priority call, an impact of said low-priority call on the communications system;

adjusting a call-admission threshold value for the low-priority call based on the estimate of said impact;

setting, based on said impact, an indicator indicating an ease of allocation of the low-priority call, so as to cause, using the set indicator, a change in said call-admission threshold-value for the low-priority call;

determining, according to said adjusted call-admission threshold value, whether to admit said low-priority call; and defining said indicator as a function determining the ease of the allocation of the low-priority call, wherein said function sets the call-admission threshold-value for the low-priority call to be equivalent to the call-admission threshold-value for a high-priority call when said impact does not exceed a threshold value defined in advance, and sets the call-admission threshold-value for the low-priority call to be lower than the call-admission threshold-value for the high-priority call when said impact exceeds said threshold value defined in advance.

* * * * *